Sept. 10, 1957 H. H. BESTEHORN 2,805,493
MECHANICAL PASTE DRYERS
Filed July 29, 1955 3 Sheets-Sheet 1

INVENTOR.
HENRY H. BESTEHORN.
BY
George A. Schweizer
ATTORNEY.

Sept. 10, 1957   H. H. BESTEHORN   2,805,493
MECHANICAL PASTE DRYERS
Filed July 29, 1955   3 Sheets-Sheet 3

INVENTOR.
HENRY H. BESTEHORN.
BY
George A. Schwenzer
ATTORNEY.

United States Patent Office 2,805,493
Patented Sept. 10, 1957

2,805,493

MECHANICAL PASTE DRYERS

Henry H. Bestehorn, Cincinnati, Ohio

Application July 29, 1955, Serial No. 525,316

11 Claims. (Cl. 34—130)

My invention relates to mechanical paste dryers. The paste in this instance is understood to be material which in the chemical process industry originates usually from the filter apparatus and consists of a soft pasty mass having somewhere between ninety and forty percent of liquid content.

In all cases the liquid content has to be evaporated so that a dry, grindable material is produced.

The evaporation of the liquid is accomplished by various methods now in use. The most important ones may be described as follows:

A simple and often used method is the spreading of the paste in layers of from one to two inches thick by hand on trays. The laden trays are then put on racks in heated chambers under atmospheric pressure or vacuum. The laden trays when dry are removed from the drying boxes, scraped and the contents transferred to a grinding device where the material is reduced to powder. This method requires considerable manual labor, handling and large areas of operation.

Another method is the use of rotating horizontal cylinders, slightly inclined to the vertical and the material is passed through the cylinder against counterflowing hot flue gases being discharged in a dry condition at the opposite end of the cylinder. These dryers are huge and require much floor space and are used exclusively for mass production of certain inorganic materials.

Drum type dryers have single or twin rollers rotating slowly on a horizontal axis. The drums must be strong enough to withstand the steam pressure for heating the drums. The slurry is placed on the exterior of the drums and when dry is removed by scraping knives.

Spray drying is accomplished by thinning the paste to watery slurry and projecting the finely dispersed slurry down through a high cylindrical chamber against upward flowing hot dry air causing the material to settle in the bottom of the chamber in a fine dust.

The foregoing devices and methods have limitations for certain usage. The rotary dryer is generally limited to materials insensitive to mass or high temperatures.

The drum dryer necessitates high installation costs, much floor space and change over from product to product, requires time consuming manual labor for cleaning.

The spray dryer requires the addition of more liquid to produce a sprayable slurry and this additional liquid increases the time for drying. The set up is bulky because of spacious chambers. The problem of de-dusting the exhaust air is difficult requiring additional complex machinery.

Generally it may be said that the drying of certain very important kinds of organic paste, especially those produced in organic dyestuff plants, offers problems of a complicated nature inherent in the fact that during the drying process initially crusts are formed on the surface of the paste mass or on clotted lumps. These crusts form an insulating layer against direct action of radiant heat. In fact, the drying after this point progresses mainly by the wick-action of the enveloping crust in such a way that the moisture is conveyed by capillary action through the crevices in the crust. The progress of the drying depends on the more or less dense quality of the crust. It is obvious that any means to keep the crust continuously broken or preventing it from forming will greatly enhance the speed of evaporation and thereby the speed of drying.

Another drawback of some of the known dryers, especially those with mechanical movement, is the loss of material through dusting which may be overcome only by additional equipment, not only on account of the value of the lost material but ever more so on account of the undesirable contamination of the atmosphere.

To overcome the inherent defects of present drying apparatus, it is an object of my invention to provide a dryer whereby a slurry or paste of any consistency will be processed and dried without the addition of liquid or other preparation of the paste.

Another object of my invention is to provide a means for drying the paste and to simultaneously pulverize the solids contained in the paste.

A further object of my invention is to provide a combination dryer and grinder whereby all solids are dried and pulverized and to prevent by my special apparatus the loss of solids while extracting moisture from the paste.

Conclusively it is an object of my invention to provide a dryer whereby the solids during drying are prevented from clotting and thereby insure complete extraction of moisture.

The most essential feature of my invention is preventing the loss of solids while extracting the moisture by providing as an integral part of the dryer, a heated filter in such a manner that optimal drying, pulverizing and salvaging of materials are simultaneously and automatically maintained.

These and other objects will become apparent from the description of my invention and the drawings forming part of this application.

In the drawings:

Figure 4 is a partially enlarged view of the means to agitate my filter bag.

Figure 1:
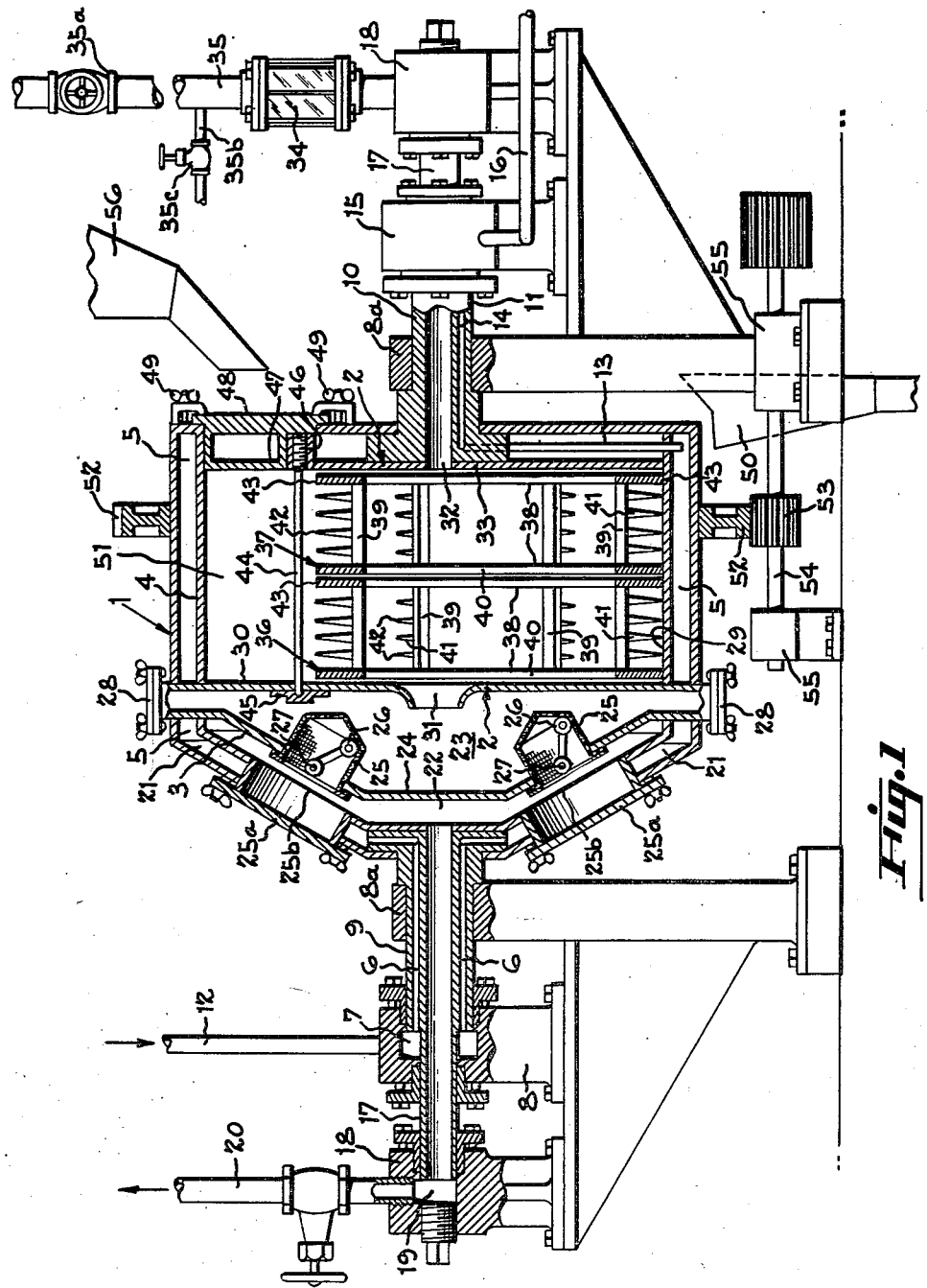
Figure 1 is an elevation in section of my preferred dryer taken on line 1—1 of Figure 3.

Referring to Figure 1 where I have shown the preferred form of my dryer there is a jacketed rotatable cylinder 1 having a flat side 2 and a truncated conical side 3. Surrounding an inner cylindrical shell 4 there is a steam space 5 wherein steam for radiantly heating the paste is admitted through orifices 6 connected to a steam chest 7 provided in a stationary bearing block 8. The cylinder is rotatably supported in bearing blocks 8a on hollow sleeve stub shaft 9 on the steam inlet end and another hollow sleeve stub shaft 10 on the steam outlet end 11. Both shafts are fixed to the cylinder and rotatable with it. A main source of supply 12 for the steam is connected to the steam chest and steam passes into the steam space through the orifices. Connecting to the steam space are tubes 13 through which condensation from the steam is free to pass during rotation of the cylinder and these tubes in turn are connected with channels 14 on the sleeve shaft 10 and these channels connect to and empty out into a condensation trap in another hollow bearing block 15 having a discharge pipe 16 through which all condensation from the steam chamber passes from the dryer. Each of the hollow sleeve shafts have extensions 17 that are rotatably supported in hollow bearing blocks 18 having chambers 19 into which are connected suction pipes 20 for reducing the pressure within the cylinder and thereby extracting the moisture from paste being dried within the cylinder. The steam supply and the suction system are independent of each other and the steam space surrounding the suction system is arranged to keep the moisture being extracted at a temperature equal to that of the steam so that there can be no condensation and thereby facilitate the removal of entrained material from the moisture laden air being extracted.

The conical side is arranged into three separate compartments, one compartment 21 is part of the steam space and is in no way connected into the compartments 22 and 23 which are part of the cylinder and connected into the suction system. Compartment 23 acts as a trap for any solids that are screened from the moisture as it is extracted from the paste. A solid plate 24 has fixedly mounted therein multiple circular screens 25 which consist of a rigid cage-like structure over which a cloth filter bag is fitted of a density adequate and selected in accordance to the material in the process of drying. The filter bag is kept in place by the clamping effect of the cage against the conical wall. This filter assembly is readily accessible through a removable cover 25a and may be removed for cleaning and recovering through the sufficiently wide opening 25b. Within the screens there are clappers 26 rotatably supported on shafts 27 and the clappers are actuated by the rotation of the cylinder. While the cylinders are rotating the clappers will thump the screens frames and cause any material that is adhering to the screens to fall into the compartment 23 where it is retained until it is removed through capped openings 28 in the compartment 23. Separating a grinding area 29 from the compartment 23 is a solid partition 30 having an opening 31 through which moisture from the material in the grinding area passes into compartment 23 on its way out through the hollow sleeve shaft and main suction line. Another opening 32 is provided in the side 33 of the cylinder and this opening may be used as an auxiliary suction outlet in the earlier stages of drying while there is little possibility of solids being entrained in the moisture being extracted. To facilitate the detection of entrained solids there is a sight glass 34 fixed in another suction line 35 which will not be used after the paste becomes relatively dry.

In the suction line 35 there is a main shut off valve 35a to shut off the suction system on this side of the dryer. A branch pipe 35b with a valve 35c connects and feeds super heated air or gases to the interior of the dryer through pipe 35. When valve 35a is closed and valve 35c is opened hot air and/or gases flow to and through the grinding area, the trap and out through the main suction line 20. The passage of the hot air or gases through the grinding area will pick up and carry suspended dried materials into the filter area where separation of the air or gases occurs and the dried material is deposited within the filter area for removal through clean out openings. In this way all of the dried material can be transferred from the grinding into the filter-area and this admission of hot air or gases facilitates drying and produces a higher degree of pulverization in the material being recovered during drying and grinding.

Within the grinding chamber there are two free rolling paddle wheel agitators 36 and 37. The agitators are constructed from two ringlike plates 38 and spaced apart and fixed in relation to each other by means of spacer bars 39 that are fixed to the ringlike plates. Outside diameters of the agitators are seventy to eighty percent of the inside diameter of the grinding chamber and the inner opening 40 of the agitators are seventy-five percent in diameter in relation to the outside diameter of the agitator.

Fixed to the spacer bars and extending at right angles therefrom are pointed cutter bars 41 for agitating and grinding the paste during the drying. The cutter bars are spaced laterally on the spacer bars around the circumference of the agitator in such a manner that they will prevent a succeeding cutter bar from finding and falling into an impression made by a previous cutter bar and thereby cause the agitation and grinding to proceed in a helical path through the drying paste. The cutting and grinding ends 42 are in line with the outer circumference 43 of the rings of the agitators and arranged to produce a chopping action on the materials but limited from rupturing the surface of the cylinder. Motion is imparted to the agitators by rotation of the drying cylinder and the agitators are free to gravitate and to roll independent of each other and independent of the cylinder.

A removable bar 44 extends through the dryer and is supported in holes 45 and 46 in the sides of the drying cylinder and is used to inhibit the agitators in an upper position within the dryer when the bar is rotated to a position diametrically opposite the positon shown in Figure 1 and when it is necessary to unload the pulverized material after drying through a manhole 47 having a cover 48 secured in place by clamp screws 49. During drying the bar will be removed so that the agitators can roll all around the inner surface of the drying cylinder. The condition illustrated shows the bar in place at the time when the dryer is to be unloaded. The manhole cover may be left off or clamped in position when the bar is inserted for unloading after drying. After placing the bar in the dryer it is rotated one half diameter until the manhole reaches a point adjacent a chute 50 where the manhole cover is removed, if it was replaced after inserting the bar and the dried material can be raked out of the dryer from a space 51 while it is at the bottom and opposite the chute because the agitators will be in suspended position.

Fixed to the outer circumference of the cylinder there is a ring gear 52 in mesh with and driven by a pinion 53 that is fixed on a rotatable shaft 54 supported in bearing blocks 55. Any suitable means may be used to drive the pinion which in turn will rotate the drying cylinder at a desired number of revolutons.

To accomplish drying of paste with my preferred apparatus the manhole is rotated to the top position adjacent to a loading spout 56 movable on tracks (not shown) as close to the drum as possible and the paste is charged into the grinding area. The bar 44 is removed after or before a load of paste is charged into the dryer through the manhole. After loading the dryer, the manhole cover is secured in place and the cylinder is rotated. During rotation steam is turned on to bring the cylinder and its component parts up to drying temperature and the paste is dried by heat radiating from the steam space.

When the proper drying temperature has been obtained both suction lines will be opened to extract the initial vapors formed by the heating of the paste. The cylinder while rotating will cause the paddle wheel agitators to rotate by gravity around on the inner circumference of the cylinder. The cutter bars on the agitators will be chopping and cutting into the paste and break it up constantly thereby presenting new surfaces in the new indentations in the paste. In this manner the paste while drying will be constantly shaved or sliced into a thin layer which will be dried rapidly by the action of the exhaust. The paste cannot adhere to the inner circumference of the dryer because the cutters will also act as scrapers by reason of the chopping action while being rotated. After the excess moisture has been removed suction line 35 will be closed and suction line 20 will remain in operation and all moisture will be extracted from within the grinding chamber through chambers 22 and 23, and hollow shaft. If desired, hot gases or air will be admitted through the drying chamber to accelerate the drying of the paste. Any entrained dried ingredients will be detained by the filtering materials 25 through which the departing moisture or dried air must pass. When the material is sufficiently dried the cylinder is stopped in the position shown in Figure 1 and the bar 44 is put in place as shown in Figure 1. The manhole is rotated to a position along side of the hopper 50. The paddle agitators will be resting on the bar 44 and therefore will not interfere with the raking out from the grinder all of the dried material. When hot gas or air is used all of the dried pulverized materials will be carried into the trap area and be removed through openings 28.

Figure 2:
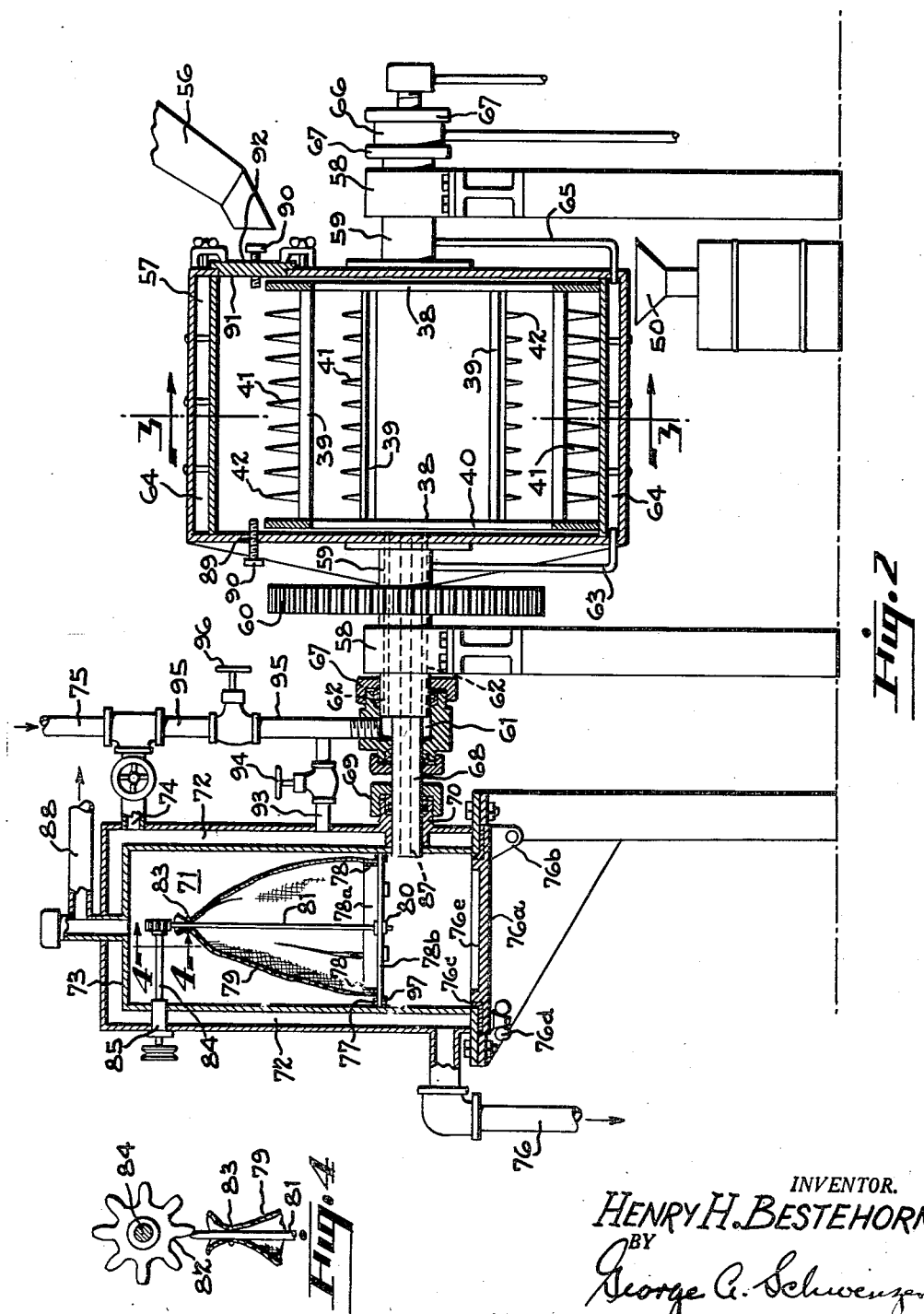
Figure 2 is an elevation in section of an alternate of my dryer taken on line 1—1 of Figure 3.
Figure 3:
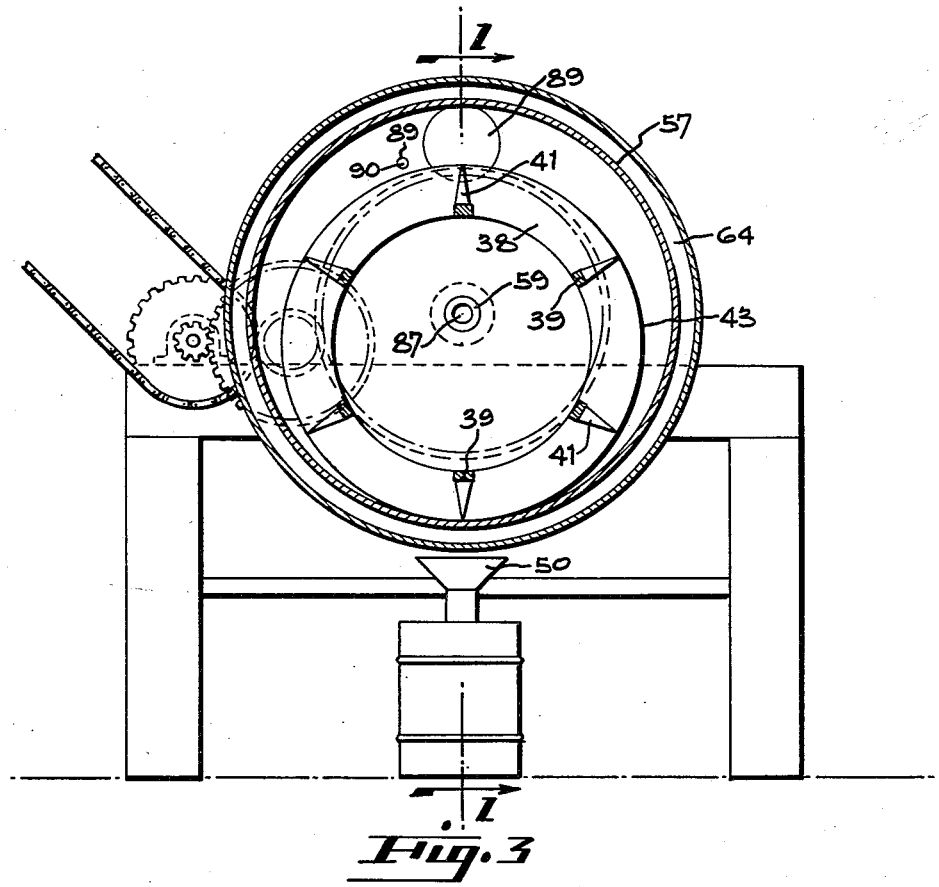
Figure 3 is an elevation in section on line 3—3 of Figure 2.
Figure 5:
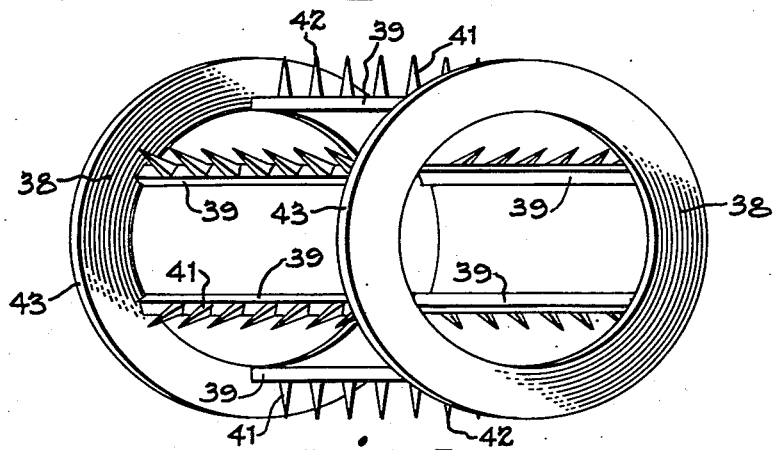
Figure 5 is a perspective view of one of my grinding wheels.

In Figure 2 I have illustrated an alternate for my preferred dryer having a steam jacketed cylinder 57 that is rotatably mounted in bearing blocks 58 on hollow stub shafts 59 that are fixedly secured to the cylinder. Fixed to the shaft is a gear 60 that may be driven by any primary source of power and this gear is the means for rotating the cylinder. A steam chest 61 is rotatably supported on the shaft and channels 62 within the shaft connect the steam chest to a pipe 63 that is connected to a steam space 64 surrounding the cylinder. Condensation from the steam passes from the steam space through another pipe 65 that connects to a hollow housing 66 that is rotatably mounted on the shaft. Leakage of steam around the shaft is prevented by the usual stuffing boxes 67 which are part of the steam chest and hollow housing.

An extension 68 of the hollow shaft is rotatably mounted in a gland 69 and a bearing 70 that is fixed on a cylindrical filter chamber 71. The filter chamber has a steam space 72 separated from the chamber by a dome 73. Steam is admitted into the steam space at 74 from a main steam line 75. Connecting to the steam space 72 there is a pipe 93 with a valve 94 that connects into a by-pass line 95 for steam to pass from the steam space 72 into the steam space 64 of the cylinder. Normally the steam is routed through these passages so that the cylindrical filter chamber will obtain the highest degree of temperature in relation to that attained in the cylinder. The by pass line 95 has a valve 96 which may be used when it is desired to by pass the filter chamber steam space and feed steam directly into the dryer. Condensation from the steam leaves through a pipe 76 by means of a conventional trap.

Within the filter chamber there is a ring 77 secured and fixed to the inside of the dome forming the filter chamber. Secured to a flange 78 of a removable ring 78a formed from a standard angle iron there is an inverted bag 79 of pervious material to provide a filter cloth that will prevent the passage of dried material. Mounted on the ring there is a bar 80 in which is fixedly mounted a vertically extending vibratable reed 81. A top end of the reed terminates in a space 82 of a rotatable cog wheel. The cog wheel when rotated vibrates the reed and the pervious bag 79 that is secured to and closed around the reed at 83 adjacent of the top of the reed. The cog wheel is fixed on a shaft 84 rotatable in a bearing 85 fixed to the filter chamber. Secured to the external end of the shaft is a pulley that is driven by any motive means. When the cog wheel is rotated, the end of the reed will pass from tooth to tooth and the reed will vibrate and shake the bag attached to it and cause any dried material that may adhere to it to fall down into the cup at the bottom of the filter chamber.

Multiple circumferentially spaced lugs 97 are secured to the inner surface of the filter chamber and they provide an opening between the ring 77 for a flange 78b of the ring 78a to hold the inverted bag in place. Notches (not shown) on the flange 78b allow the ring to be slipped over the lugs and when the ring 78a is turned the flange 78b will rest on the lugs and secure the inverted bag in place.

The bottom of the filter chamber is formed by a cover plate 76a hinged on by means of hinge 76b, and air tight by means of a suitable gasket 76c and bolts with wingnuts 76d. When opened the filter bag assembly may be taken out, for cleaning and recovering, in its entirety or only the filter residue which collects in the disk 76e fastened to this cover.

Moisture and air is extracted from the cylinder through a channel 87 which connects the drying chamber of the cylinder with the filter chamber and the moisture and air in turn is extracted from the filter chamber through the pervious bag by a main suction line 88 that is connected to any suitable suction pump.

Rotatably mounted within the cylinder there is a paddle wheel agitator as described in the preferred form. While I show only one agitator in this instance I do not wish to limit myself because a multiple of agitators can be used. This agitator is free to rotate by the action of gravity independently in relation to the rotation of the cylinder. Rotation of the cylinder imparts motion and rotation to the agitator. Tapped holes 89 are provided for stop bolts 90 that extend perpendicular through the sides of the cylinder and when the bolts are screwed into the position shown in Figure 2 the agitators will rest on them and will be inhibited from motion thereby providing a space for removing the dried ground material. A manhole 91 with a detachable cover 92 is provdied for access to the interior of the cylinder when loading and unloading for drying.

To operate my dryer the cylinder is rotated to the position shown in Figure 2 and the material to be dried is poured into the cylinder and the manhole is then secured in place. The stop screws are drawn back out from the position shown so that the agitators cannot contact them. The steam is turned on and the cylinder is rotated. Rotation of the cylinder causes the agitator to rotate around the inner surface of the cylinder. While rotating the cutters will cut into the paste being dried and agitate it thereby presenting new areas of paste for drying. All of the moisture is exhausted through the vacuum chamber through the pervious bag which will strain out any entrained dried material. The cog wheel is rotated when desired and causes the reed to vibrate and in turn the bag will undulate to keep the bag free from any dried ground material clinging to it.

In use the pressure within the dryer will be maintained below, at or above atmospheric pressure depending upon the condition to be preferred.

Having described the use of steam for drying, I do not wish to limit myself thereto because other liquids or gases may be employed in a manner similar to steam.

Having thus described my invention and desire to secure by Letters Patent I claim:

1. A paste dryer comprising a compartmented rotatable heated cylinder to radiantly heat said paste, said cylinder having a steam space for indirectly heating said paste, a grinding area for said paste within said cylinder, a truncated conical trap area for dried materials from said paste integral with said cylinder, multiple free rolling agitators rotatable within and on the inner surface of said grinding area of said cylinder, said agitators adapted to gravitationally rotate independent of each other and the cylinder, cutter bars fixed to and rotatable with said agitators and points on said cutters bars to produce a chopping action to agitate, cut and grind said paste to produce pulverized dried ingredients from said paste and means for evacuating moisture from within said cylinder while drying said paste and other means to prevent the convection of dried materials while evacuating air and moisture from said cylinder and trap area while drying said paste.

2. A paste dryer for producing dried pulverized materials from said paste comprising a compartmented rotatable cylinder, said cylinder having a steam space for radiantly heating said paste, a grinding compartment for said paste adjacent to a truncated conical trap compartment for retaining dried pulverized materials and screening means in said trap compartment to prevent the passage of dried pulverized materials from said cylinder and trap compartment and clapper means to reject pulverized materials from said screening means, free rolling agitators rotatable within and on the inner surface of said grinding compartment, said agitators adapted to be gravitationally rotated independent of each other and said cylinder by the rotation of said cylinder, cutter bar pulverizing means fixed to said agitators on a series of peripherally spaced bars off-set laterally in relation to one and the other to develop a helical path through said paste during the rotation of said agitators points of said cutter bars positioned to produce a chopping action on said material being dried and means for removing air and moisture from interior of said cylinder to produce dried and pulverized materials from said paste.

3. A paste dryer for separating solids from a slurry of paste comprising a compartmented steam jacketed cylinder, said cylinder being divided into a grinding area and a trap area, rotatable agitators actuated gravitationally within the grinding area having no interconnecting driving means between said cylinder and agitators to permit said agitators to rotate independent each to the other and of said cylinder, cutter knives secured to said agitators and spaced laterally and peripherally on said agitators to agitate and pulverize said solids in said paste, means for extracting air and moisture from said paste within said grinding area and screening means to prevent the extraction of pulverized solids from said dryer together with gravity actuated clapper means to release solids from said screening means.

4. A paste dryer adapted to receive a paste of liquid and solids comprising a closed cylinder having a steam jacket for indirectly heating said paste, pointed cutting and grinding agitators adapted to produce a chopping action on said paste, rotatable on and in relation to an inner surface of said cylinder and adapted to be rotated free from and independent of each other and said cylinder by gravitational reaction to the rotation of said cylinder, said agitators being smaller in diameter than said cylinder to provide an unloading area when said solids are dry and pulverized, rod means to maintain said agitators in suspension over said unloading area when said unloading area is positioned for unloading of said pulverized solids from said cylinder, removable means for closing said cylinder against atmospheric pressure, air and moisture extracting means for reducing the pressure within said cylinder to facilitate the drying of said paste and screening means interposed between said extracting means to prevent the loss of pulverized solids from said cylinder during drying of said paste.

5. A paste dryer for paste comprising a cylinder adapted to receive said paste, means to close said cylinder against atmospheric pressure, floating agitators adapted for free disconnected rotation in relation to the rotation of said cylinder, cutter and grinding means secured to said agitators and spaced laterally and peripherally around said agitators, points on said cutter and grinder means producing a chopping action adapted to cut said paste while drying and to chop said dried pulverized paste from the inner surface of said cylinder, said cutter and grinder means being positioned in relation to each other to chop a spiral path through said paste to insure progressive drying of said paste, means for reducing the pressure within said cylinder and extracting moisture from said paste and screening means interposed between said moisture extracting means to prevent the passage of pulverized solids from interior of said dryer and gravity actuated clapper means to release pulverized solids from said screening means.

6. A paste dryer for paste comprising a stem jacketed cylinder for heating said paste, manhole means for closing said cylinder against atmospheric pressure, floating agitators adapted for independent gravitational rotation in relation to said cylinder, pointed cutter and grinding means secured to said agitators spaced laterally and peripherally around said agitators adapted to chop and perforate said paste while drying, said pointed cutter and grinder means being positioned in relation to each other to chop a spiral path through said paste to insure progressive drying of said paste, means for reducing the pressure below atmosphere in said cylinder and extracting moisture from said paste, screening means interposed between said moisture extracting means to prevent the passage of pulverized solids from said dryer, gravity actuated clapper means to release solids from said screening means and bar means to keep said agitators in an upward position within said cylinder during removal of said pulverized dried material from said cylinder.

7. In combination with a paste dryer for drying paste comprising a stem jacketed rotatable cylinder for receiving said paste and indirectly heating said paste, floating rotatable agitators of lesser diameter than the diameter of said cylinder adapted to be gravitationally rotated free and independent of said cylinder by the rotation of said cylinder, cutter bars secured to said agitators dispersed about the periphery of said agitators and offset laterally in relation to each other for perforating said paste while drying, screw means to keep said agitators in an elevated position within said cylinder to provide a clean out area in said cylinder, a steam jacketed housing enclosing screening means of pervious material to prevent the passage of pulverized solids from said dryer, means for extracting air and moisture from said paste and means for undulating said pervious screening material to free it from dried solids entrained while extracting moisture and air from said dryer.

8. In combination with a paste dryer for paste a steam jacketed closed container having a flexible screening bag enclosed therein for preventing the passage of pulverized solids from said container, one end of said bag being secured to the sides of said container to subdivide said container into two compartments, an upper end of said bag secured to a vibratable reed to undulate said bag to free it from solids adhering to it, rotatable means to vibrate said rod and means for extracting air and moisture from said dryer and container and means on said steam heated chamber to pass said steam from said chamber to said dryer to maintain said chamber at a higher temperature than attained in said dryer.

9. A paste dryer to produce pulverized dried material comprising a compartmented rotatable cylinder with closed ends having therein multiple gravitationally rotatable spaced ring grinding and agitating spiked means, said grinding and agitating spiked means adapted to be rotated independent and parallel of each to the other and to the ends of said cylinder by rolling on an interior circumferential wall of said cylinder to grind and ventilate said paste, filtering chamber means interconnected with the interior of said cylinder having means for extracting moisture from said paste together with means for admitting ancillary hot gases to facilitate the drying of said paste and conveying said pulverized dried material from said paste from said cylinder into said filter chamber.

10. A paste dryer to produce pulverized dried material comprising a closed ended compartmented rotatable cylindrical chamber having therein multiple gravitationally rotatable spaced ring grinding and agitating helically spaced spiked means, said grinding and agitating means adapted to be rotated independent and parallel of each to the other and said closed ends of said cylindrical chamber by rolling on the interior of said cylindrical chamber to cause said spiked means to grind and ventilate said paste, filtering chamber means interconnected with the interior of said cylindrical chamber having means for extracting moisture from said paste together with means for admitting ancillary hot gases to facilitate the drying of said paste and conveying said pulverized dried material from said paste from said cylindrical chamber into said filter chamber together with means for separating said pulverized dried material from said ancillary hot gases before discharging said gases from said filtering chamber.

11. A paste dryer in which paste to be dried is subjected to radiant heat internally of said dryer comprising a closed rotatable cylinder and an agitator of spaced rings rotatable parallel of ends of said rotatable cylinder and upon and independent of an inner peripheral surface of said rotatable cylinder peripherally spaced rods securing said rings in spaced relation each to the other and spaced pointed cutters perpendicular to said rods arranged in offset relation each to the other to provide a helical cut path through said paste during rotation of said cylinder and agitator.

References Cited in the file of this patent

UNITED STATES PATENTS

| | | |
|---|---|---|
| 514,097 | Sly | Feb. 6, 1894 |
| 788,675 | Rissmuller | May 2, 1905 |
| 841,728 | Sly | Jan. 22, 1907 |
| 946,196 | Bills | Jan. 11, 1910 |
| 1,720,024 | Young | July 9, 1929 |
| 2,557,528 | Andrews | June 19, 1951 |